July 2, 1935.　　　　A. K. LONGREN　　　2,006,468
AIRPLANE FUSELAGE
Filed Oct. 16, 1931　　　4 Sheets-Sheet 4
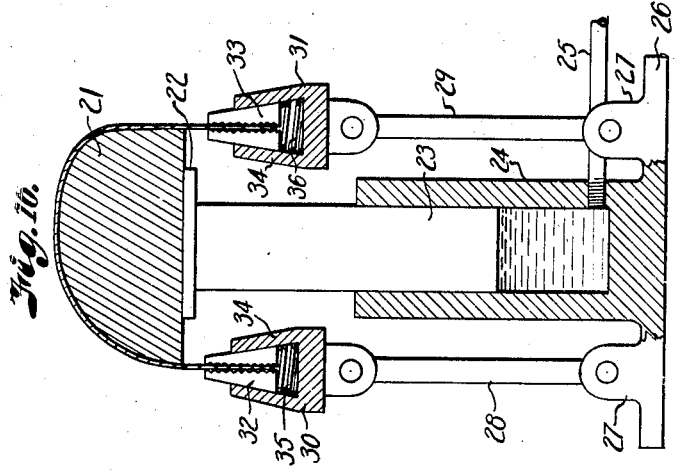
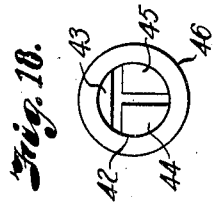
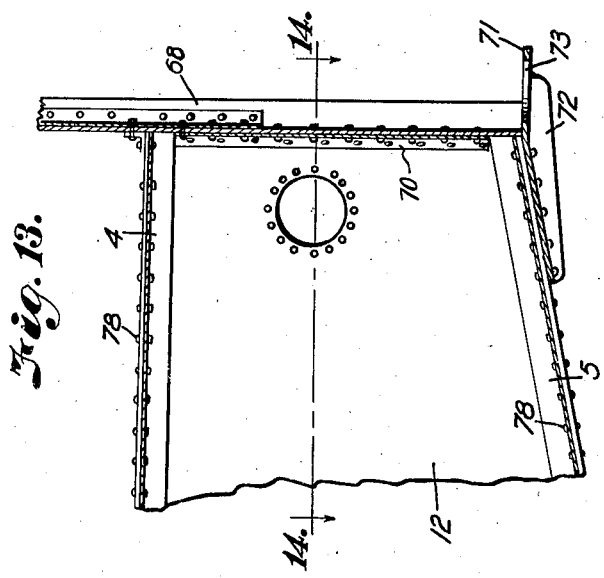
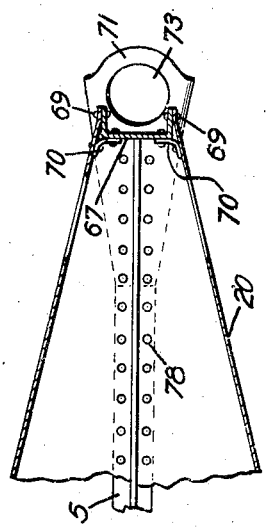
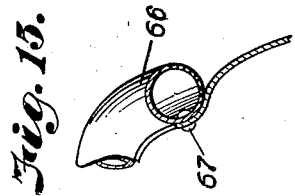
INVENTOR.
Albin K. Longren,
BY
ATTORNEY.

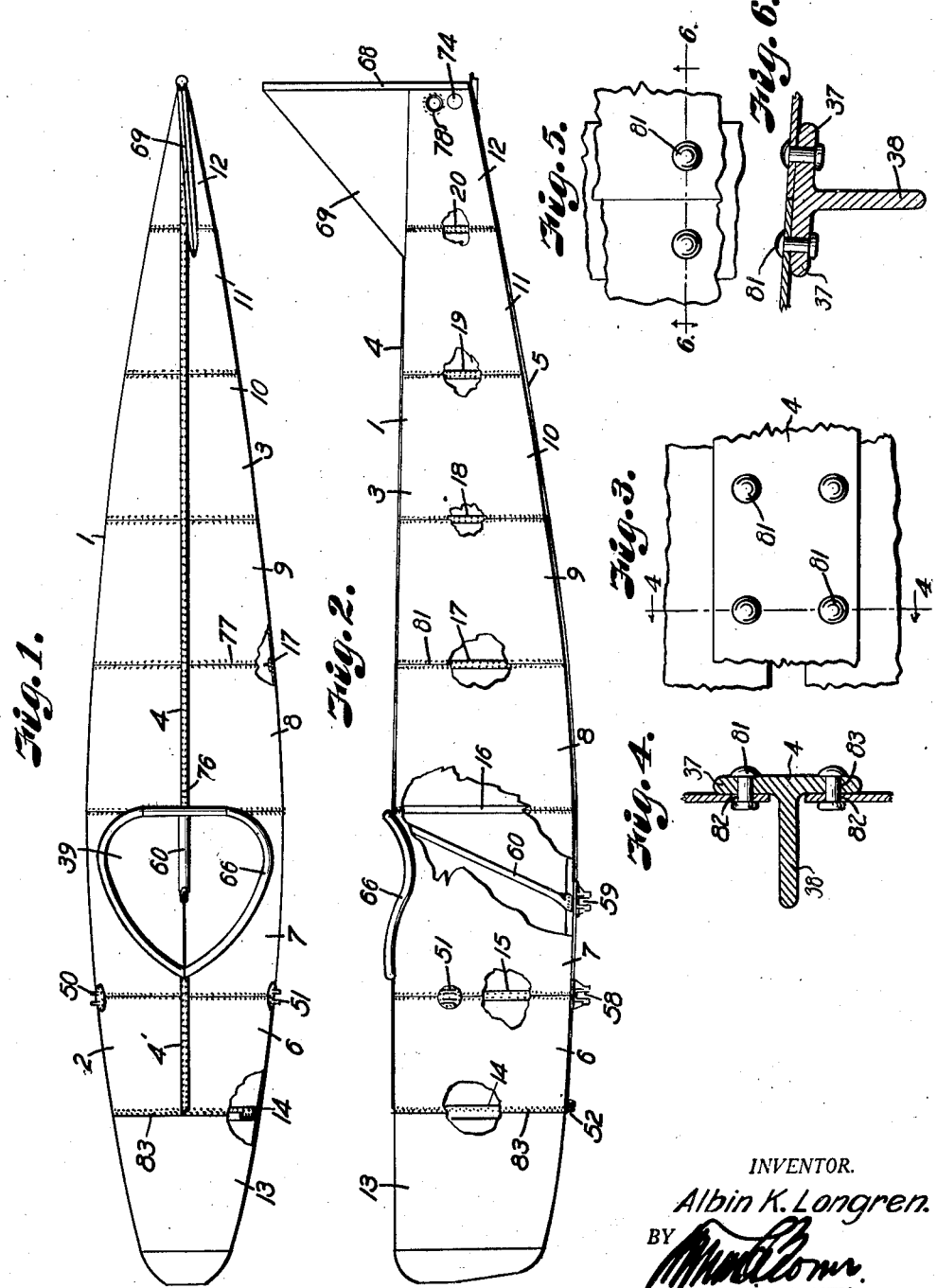

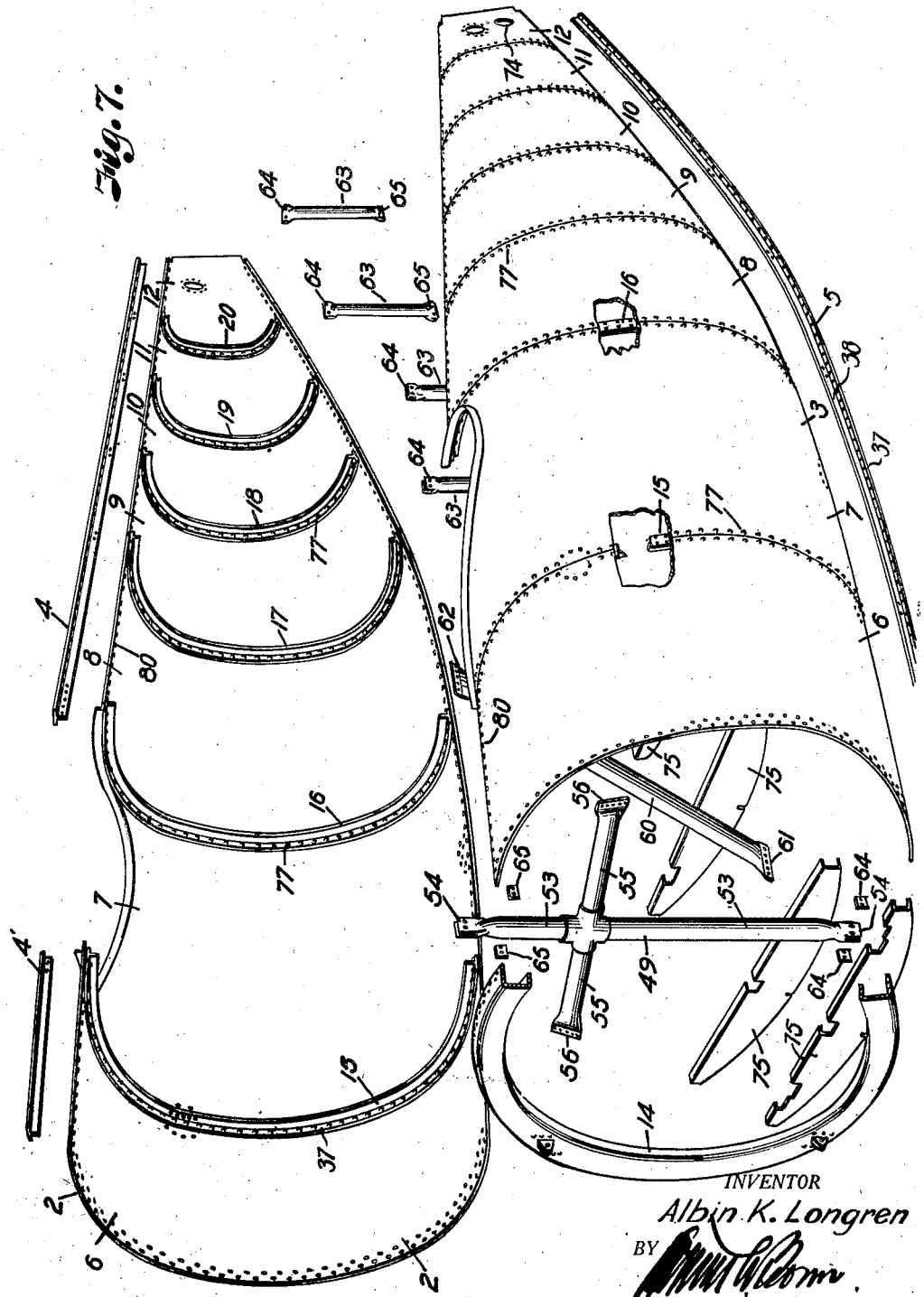

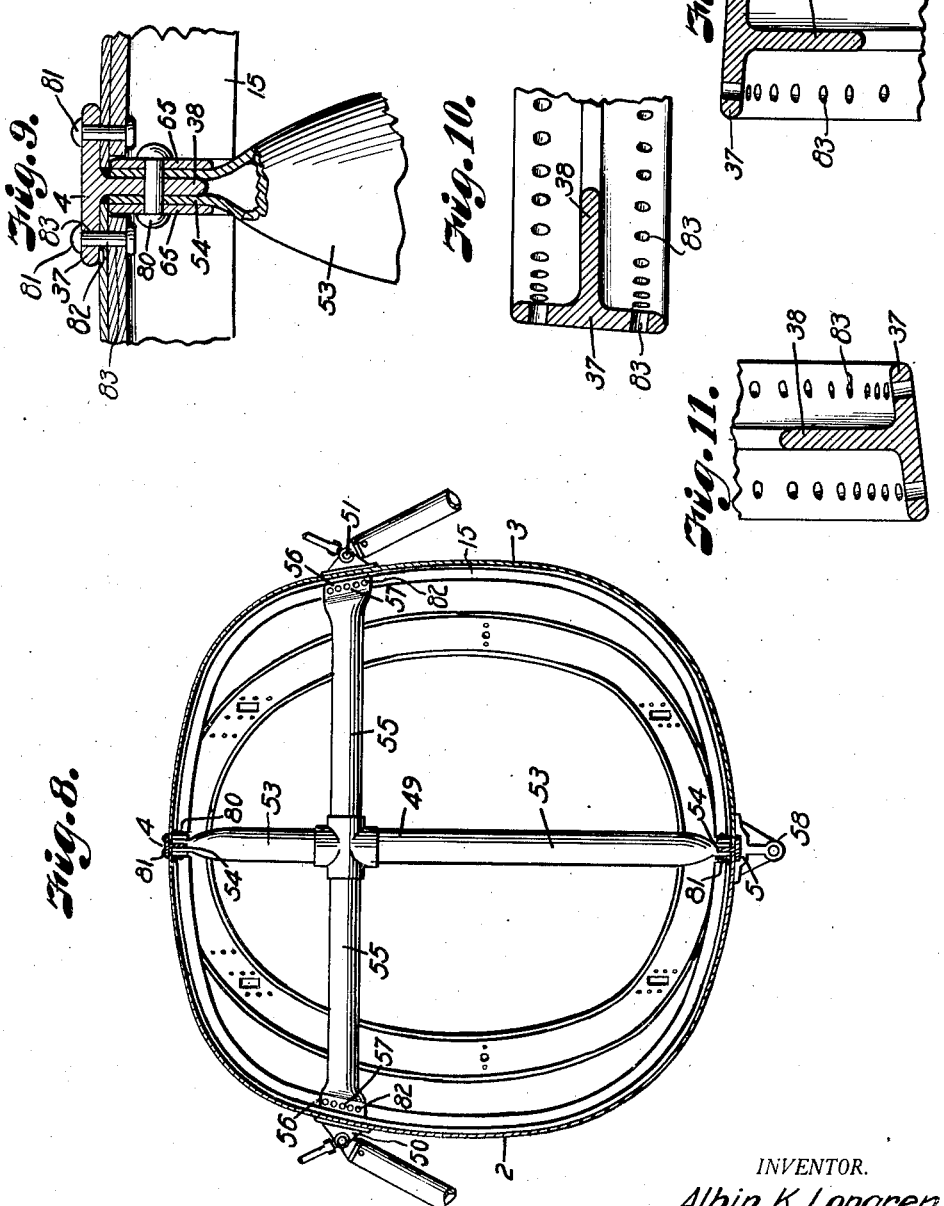

Patented July 2, 1935

2,006,468

UNITED STATES PATENT OFFICE 2,006,468

AIRPLANE FUSELAGE

Albin K. Longren, Kansas City Airport, Clay County, Mo.

Application October 16, 1931, Serial No. 569,185

6 Claims. (Cl. 244—30)

This invention relates to airplane fuselages and to a method of making the same, and has for its principal objects to provide a metallic semi-monocoque type of construction wherein all of the component parts are free from fabricational stress which tends to distort and weaken the body structure, to provide a body which is truly streamlined and free from protruding seams and other irregularities that ordinarily cause air friction, and to provide a body skin construction having sufficient rigidity to protect the occupants in case of accident.

Other important objects are to provide a fuselage construction which provides simplicity and accuracy in production and permits ready replacement of the body skin sections, or other parts, in the case of damage.

It is also an important object of the invention to provide a fuselage wherein the body skin is relied upon to carry the shear and bending loads, thereby providing an interior free from diagonal and transverse cross bracing, as well as providing a structure having higher weight-strength ratio.

Another important object of the invention is to provide a body structure wherein all parts are readily accessible for inspection and repair.

Other objects of the invention are to permit standardization of parts so that tocks may be made readily available for repairs and replacements, and to provide preformed parts so that they may be nested together and stored or shipped to distant points for assembly.

In accomplishing these and other objects of the invention, I have provided improved details of structure and method of manufacture, illustrated in the accompanying drawings, wherein:

Fig. 1 is a top plan view of a completely assembled fuselage constructed in accordance with my invention, parts of the body skin sections being broken away to better illustrate the former rib structure.

Fig. 2 is a side elevational view of the fuselage showing parts of the body skin structure broken away to better illustrate the cockpit slant tube.

Fig. 3 is an enlarged fragmentary plan view of a longéron and adjoining portions of the body skin sections illustrating their attachment to one of the longérons.

Fig. 4 is a cross section on the line 4—4, of Fig. 3.

Fig. 5 is a fragmentary face view of abutting skin sections and their connection to a former rib.

Fig. 6 is a sectional view on the line 6—6 of Fig. 5.

Fig. 7 is a detail perspective view of the main fuselage sections partly assembled and shown in spaced relation, with the longérons, front bulk head, cross member, station tie tubes, and control system transverse members ready for assembly.

Fig. 8 is an enlarged cross section through the body at a point in front of the cockpit looking toward the front bulk head.

Fig. 9 is an enlarged section through the upper longéron illustrating attachment of the vertical arm of the cross member bracing the wing and landing gear connections.

Figs. 10, 11 and 12 are enlarged fragmentary sections through the former ribs illustrating the varying inclinations of the lateral flanges with relation to their vertical flange.

Fig. 13 is an enlarged longitudinal section through the tail portion of the fuselage.

Fig. 14 is a horizontal section on the line 14—14 of Fig. 13.

Fig. 15 is a sectional view through a portion of the fuselage adjacent the cockpit to illustrate attachment of the pit reinforcing tube.

Fig. 16 is a diagrammatic view showing the method of stretching the body skin sections of the fuselage into their required shape.

Fig. 17 is a top plan view of one of the rib-stretching forms.

Fig. 18 is a top plan view of one of the former rib-gripping jaws.

Referring more in detail to the drawings:

I designates an airplane fuselage composed of right and left half sections 2 and 3 that are joined together by upper and lower longérons 4 and 5. The sections 2 and 3 are identical in shape and construction, each comprising a series of metal skin sections 6, 7, 8, 9, 10, 11 and 12, and a front cowling sheet or hood 13. The sheets of each section are preferably of sufficient length to extend from the upper to the lower longérons in order that longitudinal side seams and additional longérons may be eliminated at the sides of the body, and are of sufficient width to cover the respective spaces between a front bulk head 14 and former ribs 15, 16, 17, 18, 19 and 20 located at spaced station points along the length of the body.

In carrying out my invention, the skin sections are preshaped to their required curvature and constitute not only the skin of the fuselage but they are also relied upon to carry the load stresses exerted upon the body, and for this reason I prefer to construct them of light weight, relatively heavy gage metal, for example an aluminum alloy. Thus while the weight of the sheets is increased, the total weight of a given size body is less than those now in use employing conventional inner trussing and cross bracing, since these elements are eliminated in my construction.

By constructing the skin sections of relatively heavy gage metal, they will retain their shape after being formed and may be nested into one another for storage or for shipping to distant points for assembly, without fear of the parts becoming distorted. The thicker sections also permit shaping by stretching process whereby the metal is stretched over a form beyond its yield point so that the shaped section retains its imparted form regardless of its degree of curvature.

To shape the skin sections, I provide a series of forms 21, one of which is illustrated in Fig. 16, and each form has the exact curvature of the body area in which the section is to be inserted. These forms may be constructed of any suitable material shaped to the calculated dimensions for giving the stream-like effect and contra-flexure curvatures desired, and are provided with highly polished surfaces, across which the sections may move during the stretching process now described.

The forms 21 are removably applied to a stretching machine, diagrammatically illustrated in Fig. 16 as including a form support 22 carried by a hydraulically operated piston 23 operating in a cylinder 24 under influence of fluid supplied through a pipe 25. The cylinder 24 is supported on a base 26 having ears 27 at opposite sides thereof to pivotally mount anchoring rods 28 and 29 carrying slip sockets 30 and 31, each having pairs of gripping jaws 32 and 33 for gripping and anchoring the ends of a section being shaped. The pairs of gripping jaws are wedge-shaped and are slidably mounted in dovetail or tapered recesses 34 formed in the sockets, and are retained in gripping position at the upper open ends of the recesses by springs 35 and 36.

In forming the respective skin sections, they are cut to suitable length and width to provide sufficient gripping surface for the jaws 32 and 33. The skin sections are then heated in a suitable furnace and brought to the required temperature, after which the section is removed from the furnace and quenched to complete a heat treatment, thereby effecting a setting or hardening process. After the quenching and before the metal has reached its final degree of hardness or tensile strength, the section is curved over the top of its form and the surplus metal which was left along the two side edges of the section is inserted between the gripping jaws previously described.

The liquid is then pumped into the cylinder 24 to cause the piston 23 to rise in the cylinder and elevate the form against the inner surface of the skin section, to stretch the section tightly across the face of the form. This stretching process is continued until the metal has passed beyond its yield point, that is, the point where it tends to return to its original shape, and thereby cause the section to permanently assume the shape of the form. This last feature is of vital importance, because, should the section spring backwardly ever so slightly, the resultant shape will not have the permanent curvature which is so necessary in obtaining the desired stream-line effect without distortion when the section is assembled in abutting relation with the other sections forming the body.

After the section is thus formed, the pressure is relieved and a marking tool is run along the edges of the form, marking a trim line on the sheet. The form is then lowered and the section removed from the gripping jaws. The section is then cut along the trim lines, the edges smoothed and the necessary holes are formed for securing the section to the longérons and former ribs as later described. The form will then be removed and successive forms will be inserted into the stretching machine to produce all of the sections necessary to complete the body construction.

The former ribs are also made in rights and lefts and are of sufficient length to extend half way around the girth of the body as do the skin sections previously described, the ribs being slightly shorter than the sections to provide clearance for portions of the longéron tie tubes later described. The longérons and former ribs are preferably formed of extruded metal having T-shape cross section, and the horizontal flanges 37 thereof may be shaped to follow the stream lines of the skin sections, but the vertical flanges 38 of the members are retained in a true perpendicular plane and constitute truss flanges for reinforcing the horizontal or skin-securing flanges (see Figs. 10, 11 and 12).

It will be noted from the drawings that the upper longéron is constructed in two sections 4 and 4' because of the cockpit opening 39 formed in the upper central portion of the body between the pairs of former ribs 15 and 16. However, the lower longéron is of one piece and extends the entire length of the body.

The former rib elements are also shaped by stretching them over suitable forms, as illustrated in Fig. 17. These forms comprise plates 40 and 41, spaced apart a sufficient distance to accommodate the vertical web of the T members therebetween and have their edge faces formed on constantly changing arcs and angles to conform to the desired shape to be imparted to the T members.

Owing to the different shapes of the members, as well as to the necessity for providing rights and lefts, a form must be provided for each T member. These forms are applied to the table of the stretching machine illustrated in Fig. 16, as are the body section forms previously described. The gripping jaws 42, however, are shaped to engage the flanges of the angle, comprising three slips 43, 44 and 45, slidably mounted in cylindrical tapered sockets 46, as shown in Fig. 18. The slips thus form a T-shaped recess to accommodate the ends of the T members. The T members are also stretched beyond the yield point of the metal so that they will retain the shape imparted to them and so that the vertical web portion thereof will maintain a straight and true position and will not twist laterally, due to internal strains when the stretching process is completed. After stretching, the members are cut to length and suitable holes are punched to match the holes in the skin sections.

The bulk head 14 is channel-shaped and has the same contour as the cross section of the body at the point in which it is inserted. This ring not only serves to stiffen the body construction, but provides a support to which the motor will be attached and a rest for the rear edge of the hood section 13.

Secured to the vertical webs 38 of the upper and lower longérons in the plane of the former ribs 15 is a cross-shaped member 49 for reinforcing and stabilizing the body construction against a portion of the forces exerted by the wing structure carried by the fitting 58. This cross member preferably comprises a vertical tubular arm having its ends flattened as at 53 and slitted to form bifurcated heads 54 for admitting the vertical flanges of the longérons, and horizontal arms 55 having similar bifurcated ends 56 by which the flanges may be attached to the vertical web flanges of the former ribs 15 by a series of rivets or the like 57, as best shown in Fig. 8. This part of the body must also be braced to withstand the main stresses and strains exerted by the landing gear which is attached to this point of the body by fitings 50, 51 and 58 positioned in the plane of the former ribs 15, as now described.

In order to brace the body adjacent the fitting 58 to withstand the stresses exerted against the lower portion of the body, I provide a slant tube 60 having bifurcated ends 61 and 62 for straddling the vertical flange of the upper and lower longérons at points adjacent the rear edge of the cockpit opening and above the fitting 59, respectively. This member is also preferably of tubular construction and extends in a vertical plane of the longérons and between the passenger seats (not shown).

The longérons are also interconnected by vertical tubular members or tie tubes 63 having flattened bifurcated ends 64 and 65 for straddling the inwardly extending flanges of the longérons in the plane of each of the former ribs, as does the cross member above described.

In order to prevent the arms of the cross and slant tube 60 from breaking at the juncture of the flattened portions with the tubular portions thereof, I provide juxtaposed reinforcing plates 65 as illustrated in Figs. 7 and 9, which are attached by the same rivets that secure the tubular members 49, 55 and 60. The body skin sections 7 are cut away adjacent their upper edges and are bent upwardly to form a circumferential flange about the cockpit to attach metal tube sections 66 for providing a finished and reinforced edge therefor, as illustrated in Fig. 15, the tubes being secured to the flanges by suitable fastening devices 67.

Located at the rear ends of the tail sheets 12 is a vertically extending channel 68 which acts as a support for the fin 69 and to which the rudder post support (not shown) is attached. The channel is secured by suitable fastening devices such as rivets which extend through the sheets and the flanges of the channel 68. The attachment of the channel member is also reinforced by suitable angle plates 70 riveted to the web of the channel and the tail skin sections, as shown in Fig. 14. A third wheel bearing plate 71 is also secured to the under side of the lower longéron and projects beyond the channel member 68, as shown in Figs. 13 and 14. This bearing support is provided along its longitudinal edges with stiffening ribs 72 and with a bearing receiving opening 73 for the fork stem of the third wheel, not shown.

The tail skin sections 12 are also provided with suitable inspection openings 74 through which the elevator controls may be inspected as in standard airplane construction. The body may also be provided with suitable transverse members 75 to which the control elements and cockpit seats may be attached and which may assume various shapes required for attachment of the various elements of equipment.

In assembling an airplane from the parts previously described, the bulk head ring, cross member, slant tube, tie tubes and tail post channel are connected to the longérons by rivets or other suitable fastening devices 80. The former ribs are then located in their proper positions on the longérons. The skin sections 6 to 12 are then secured to the longérons and ribs with their end edges abutting and overlying the horizontal flanges of the former ribs, and their upper and lower edges underlying the horizontal flanges of the longérons. The skin sections are secured by rivets or the like 81 extending through the openings 82 in the sheets and aligning openings 83 in the flanges of said rib and longéron members.

The members 50, 51, 52, 58, 59 and 78, and other necessary fittings may be secured in their proper positions, after which the inner cockpit members 75 may be attached and the reinforcing tube sections 66 put in place. The fuselage may then be finished by painting or lacquering, or otherwise treated to give a lasting and finished exterior.

From the foregoing description, it is apparent that, each part being accurately formed and preshaped, the parts may be assembled with greater speed and accuracy, as each part will take its place in the assembly without drawing the parts together, thereby eliminating tensional or torsional strains in the structure; also, the metal parts will retain their shape due to the fact that the metal has been stretched beyond the yield point. This stretching process is also important as it gives accurate check on the quality of each part and defective parts may be ejected.

If any weak spots exist within the metal, the sheets will thin out or fracture and are in most instances discernible to the naked eye. However, microscopic examination and gauge tests may be readily made to determine the defective parts.

Another important feature of the invention is that none of the sheets overlap. This simplifies production and assembly, and makes replacements of body skin sections a very simple procedure, since any section may be removed and replaced without disturbing a single rivet in any of the adjoining sections.

Attention is also directed to the fact that the abutting skin sections support compression loads and also take the shear off the rivets in case of applied forces tending to crinkle the body sections.

What I claim and desire to secure by Letters Patent is:

1. An airplane body including a skin formed of abutting sections, and a plurality of arcuate T-shaped former ribs therein for securing abutting skin sections together, the head flange of each of said ribs arranged at a constantly varying angle to its web and the curvature of said ribs constantly varying throughout their length.

2. An airplane body comprising a pair of complementary sections each composed of a plurality of laterally extending sheets, ribs for securing adjacent sections together, longérons for securing said sections together along their longitudinal edges, a plurality of braces connecting said longérons, and a cross shaped brace member connected to said longérons and to a rib of each section at the point of greatest stress on said body.

3. An airplane body including a skin formed of abutting sections and a plurality of arcuate former ribs for securing the abutting skin sections together and having constantly varying curvatures throughout their length, said former ribs having vertical portions and attaching portions arranged at constantly varying angles to said vertical portions for conforming to the shape of the abutting skin sections.

4. An airplane body comprising a pair of complementary sections each composed of a plurality of laterally extending sheets, ribs for securing adjacent sheets together, longérons for securing said sections together along their longitudinal edges, and a cross shaped brace member connected to said longérons and to a rib of each section at the point of greatest stress on said body.

5. A stream-lined hollow body of the character described including preshaped longérons, arcuate T-shaped former ribs located at spaced station points along the longerons and each having its head flange arranged at constantly varying angles to its web and varying curvature throughout the length thereof, means securing the former ribs to the head flanges of the longérons, a plurality of preformed plain skin sections enclosing the spacings between said station points and having longitudinal edges conforming in shape to the longérons and transverse edges conforming to the shape of the head flanges of the former ribs to lie flatly thereagainst and arranged so that the edges of one section abut squarely against the edges of the adjacent section at a point over the head flanges of the former ribs to support compression loads acting on the body, fastening devices extending through the longitudinal edges of the skin sections and the longérons, and fastening devices extending through the skin sections at the opposite sides of said abutting edges and through the head flange of the underlying former rib for securing the sections and retaining the edges in contiguity to provide a stream-lined body free from surface irregularities.

6. A stream-lined body of the character described including spaced longérons, former ribs located at spaced station points along the longérons and provided with flange portions having a constantly varying angle and curvature throughout the length of the former ribs to conform to the desired cross section and to the fore and aft curvature of the body at said station points, means securing the former ribs to the longérons, a plurality of preformed plain metallic skin sections each having their internal structure stretched beyond the yield point of the metal in all directions to retain said preformed shape for enclosing the spacing between said station points and having longitudinal edges conforming in shape to the longérons and transverse edges conforming to the shape of said flange portions of the former ribs to lie flatly thereagainst and arranged so that the edges of one section abut squarely against the edges of the adjacent sections at a point over said flange portions to support compression loads on the body and to reduce stresses incidental to transverse loads acting on one section from being transferred to the adjacent sections, means securing said longitudinal edges of the skin sections to the longérons, and means extending through the skin sections at opposite sides of said abutting edges and through the underlying flange portions for securing the sections and retaining said edges in contiguity to provide a stream-lined body free from surface irregularities.

ALBIN K. LONGREN.